(12) United States Patent
Lovell

(10) Patent No.: US 8,220,485 B2
(45) Date of Patent: Jul. 17, 2012

(54) PNEUMATIC PILOT VALVE

(75) Inventor: Michel K. Lovell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 1050 days.

(21) Appl. No.: 11/141,790

(22) Filed: May 31, 2005

(65) Prior Publication Data

US 2006/0266960 A1    Nov. 30, 2006

(51) Int. Cl.
*F16K 31/04* (2006.01)

(52) U.S. Cl. .............. 137/596.17; 137/625.26; 251/333; 251/363

(58) Field of Classification Search .................. 137/596, 137/596.17, 596.18, 596.1, 596.2, 625.26; 251/363, 333
See application file for complete search history.

(56) References Cited

U.S. PATENT DOCUMENTS

| | | | | |
|---|---|---|---|---|
| 1,373,599 | A | * | 4/1921 | Clark ........................ 137/596.18 |
| 2,913,005 | A | | 11/1959 | Grant et al. |
| 3,193,250 | A | * | 7/1965 | Good et. al. .................. 251/363 |
| 3,391,711 | A | * | 7/1968 | Wade ........................ 137/625.26 |
| 3,415,284 | A | | 12/1968 | Stampfli |
| 3,706,325 | A | | 12/1972 | Pauliukonis |
| 4,161,136 | A | | 7/1979 | Krieger |
| 4,491,154 | A | * | 1/1985 | Peters ........................ 137/625.66 |
| 4,700,738 | A | | 10/1987 | Frese et al. |
| 4,722,362 | A | | 2/1988 | Muschong et al. |
| 5,104,091 | A | | 4/1992 | Rathay et al. |
| 5,190,356 | A | | 3/1993 | Knowles |
| 6,497,246 | B1 | | 12/2002 | Nicewarner et al. |
| 2004/0129907 | A1 | | 7/2004 | Lovell et al. |
| 2006/0162787 | A1 | * | 7/2006 | Yeh ........................ 137/596.17 |

FOREIGN PATENT DOCUMENTS

| | | |
|---|---|---|
| DE | 2710649 B1 | 7/1978 |
| EP | 0500162 A2 | 8/1992 |
| GB | 510467 | 8/1939 |
| GB | 1002515 | 8/1965 |
| JP | 48-038723 U | 9/1946 |
| JP | 49-005901 U | 4/1947 |
| JP | 53-075523 U | 11/1951 |
| JP | 46-34959 | 12/1971 |

(Continued)

OTHER PUBLICATIONS

International Search Report in International (PCT) Application PCT/US2006/019283, by the European Patent Office, dated Sep. 21, 2006.

(Continued)

*Primary Examiner* — Craig Schneider
(74) *Attorney, Agent, or Firm* — Marshall, Gerstein & Borun LLP

(57) ABSTRACT

A pneumatic pilot valve comprises a valve body having an inlet, an outlet, a flow passage, and first and second valves arranged to control flow through the valve. The second valve includes a tapered valve seat opening into a cylindrical bore, and a thrust pin includes a tapered second part and an annular recess having a seal. The thrust pin is movable between a first position, a second position, and an intermediate position. The tapered second part of the thrust pin is arranged to engage the tapered valve seat to close the second valve when the thrust pin moves to the second position, and the resilient seal is sized to engage the cylindrical bore when the thrust pin is in the intermediate position.

23 Claims, 7 Drawing Sheets

FOREIGN PATENT DOCUMENTS

JP  63-117078 U  7/1988
JP  05-047875 U  6/1993

OTHER PUBLICATIONS

Written Opinion for Application PCT/US2006/019283 by the European Patent Office, dated Aug. 7, 2006.
Third Chinese Office Action for Application No. 200680018772.1, dated Aug. 8, 2011.
Notification of First Office Action for Chinese Application No. 200680018772.1, dated Jun. 26, 2009.
Japanese Notice of Reasons for Rejection for Patent No. 2008-514677 dated Feb. 22, 2011.
Japanese Notice of Reasons for Rejection for Application No. 2009-526597, dated Feb. 14, 2012.
Fourth Office Action for Chinese Application No. 200680018772.1, dated Apr. 6, 2012.

* cited by examiner

PNEUMATIC PILOT VALVE

FIELD OF THE INVENTION

The present invention relates generally to liquid level controllers for controlling the level of liquid in a vessel and, more particularly, to pneumatic pilot valves for use on liquid level controllers.

BACKGROUND OF THE INVENTION

Liquid level controllers for controlling the level of liquid in a storage vessel are generally known in the art. As is known, such liquid level controllers typically use a pneumatic pilot valve. The pneumatic pilot valve typically includes a pneumatic inlet, a pneumatic outlet, and an exhaust. Such pneumatic pilot valves are typically connected to a pneumatic source, such as shop air.

However, in some process environments, a source of shop air is not available, and in those process environments the pneumatic pilot valve is connected to another pneumatic source, such as the pressurized process medium in the process environment. Typically, the process environment is an industrial manufacturing, processing and/or storage facility such as a chemical plant, a refinery and/or a shipping terminal.

Many pneumatic pilot valves typically include a first valve, a second valve, and a shiftable thrust pin. The thrust pin shifts between a first position in which the first valve is closed and a second position in which the second valve is closed. Such valves typically exhaust a measurable quantity of the pneumatic source when the thrust pin shifts between a first position and a second position. In the event the pneumatic source is shop air, the periodic loss of a measurable quantity of shop air is not a concern. However, when pneumatic pilot valves are used in some of the process environments discussed above where shop air is not available, the venting of a measurable quantity of the process medium can have measurable monetary and environmental implications.

SUMMARY OF THE INVENTION

In accordance with an aspect of the invention, a pneumatic pilot valve comprises a valve body having an inlet, an outlet, and a flow passage extending between the inlet and the outlet, a first valve arranged to control flow through a first part of the flow passage, and a second valve arranged to control flow through a second part of the flow passage, with the second valve including a tapered valve seat opening into a cylindrical bore. A thrust pin is disposed in the flow passage and includes a first part, a tapered second part, and an annular recess adjacent the tapered second part having a seal. The thrust pin is movable between a first position, a second position, and an intermediate position. The first part of the thrust pin is arranged to permit the opening of the first valve as the thrust pin approaches the first position and is arranged to permit the closing of the first valve as the thrust pin moves away from the first position. The tapered second part of the thrust pin is arranged to engage the tapered valve seat to close the second valve when the thrust pin moves to the second position. The resilient seal is sized to engage the cylindrical bore when the thrust pin is in the intermediate position.

In further accordance with a preferred embodiment, the resilient seal is an elastomeric O-ring, and the annular recess is disposed immediately adjacent the tapered second part of the thrust pin. The thrust pin defines an axis, and the annular recess and the cylindrical bore are sized and positioned to compress the resilient seal in a direction perpendicular to, or predominantly perpendicular to, the axis of the thrust pin. A distance between a widest part of the tapered valve seat and an opening of the cylindrical bore defines a deadband, or the deadband may be defined by the distance traveled by the thrust pin when both of the first and second valves are closed.

The valve body may include an adjustment recess, and the cylindrical bore may be carried by more operatively coupled to an adjustment collar, and the adjustment collar maybe shiftably disposed in the adjustment recess in a direction parallel to an axis of the thrust pin. The adjustment recess and the adjustment collar may be threaded. The adjustment recess may be disposed about an axis coaxial with the axis of the thrust pin. The adjustment recess preferably is formed in the valve body and includes a seal disposed in the adjustment recess between the adjustment collar and the valve body.

In accordance with another aspect of the invention, a pilot valve for use with a liquid level controller comprises a valve body having an inlet, an outlet, a flow passage extending between the inlet and the outlet, and an exhaust port in communication with the flow passage. A first valve is arranged to control flow through a first part of the flow passage, and a second valve is arranged to control flow through a second part of the flow passage, with the second valve including a valve seat opening to a cylindrical bore. A thrust pin is disposed in the flow passage and includes a first part, a second part, and a resilient seal adjacent the second part, the thrust pin movable between a first position, a second position, and an intermediate position. The first part of the thrust pin is arranged to cause the opening of the first valve as the thrust pin approaches the first position and is arranged to cause the closing of the first valve as the thrust pin moves away from the first position. The second part of the thrust pin is arranged to engage the valve seat to close the second valve when the thrust pin moves to the second position, and the resilient seal is sized to seal the cylindrical bore when the thrust pin is in the intermediate position.

Further, the pilot valve is in combination with comprising a liquid level controller having a first line in flow communication with the inlet of the valve body, and a second line in flow communication with the outlet of the valve body. The liquid level controller is in flow communication with a vessel and is arranged to control a level of liquid in the vessel.

In further accordance with yet another aspect of the invention, a pneumatic pilot valve includes a valve body having an inlet, an outlet, and a flow passage extending between the inlet and the outlet, a first valve arranged to control flow through a first part of the flow passage, and a second valve arranged to control flow through a second part of the flow passage, with each of the first and second valves including a tapered valve seat opening into a cylindrical bore. A thrust pin is disposed in the flow passage and includes a tapered first part and a tapered second part, the thrust pin including a first resilient seal disposed adjacent the first part and a second resilient seal disposed adjacent the second part, the thrust pin movable between a first position, a first intermediate position spaced away from the first position by a first deadband distance, a second position, and a second intermediate position spaced away from the second position by a second deadband distance. The tapered first part of the thrust pin closing the first valve as the thrust pin moves into the first position, the first seal arranged to close the first cylindrical bore when the thrust pin is in the first intermediate position, the tapered second part of the thrust pin closing the second valve as the thrust pin moves into the second position, the second seal arranged to close the second cylindrical bore when the thrust pin is in the second intermediate position.

DESCRIPTION OF THE PREFERRED EMBODIMENTS

Although the following text sets forth a detailed description of an exemplary embodiment of the invention, the legal scope of the present invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, and these alternatives would still fall within the scope of the claims defining the invention.

Figure 1:
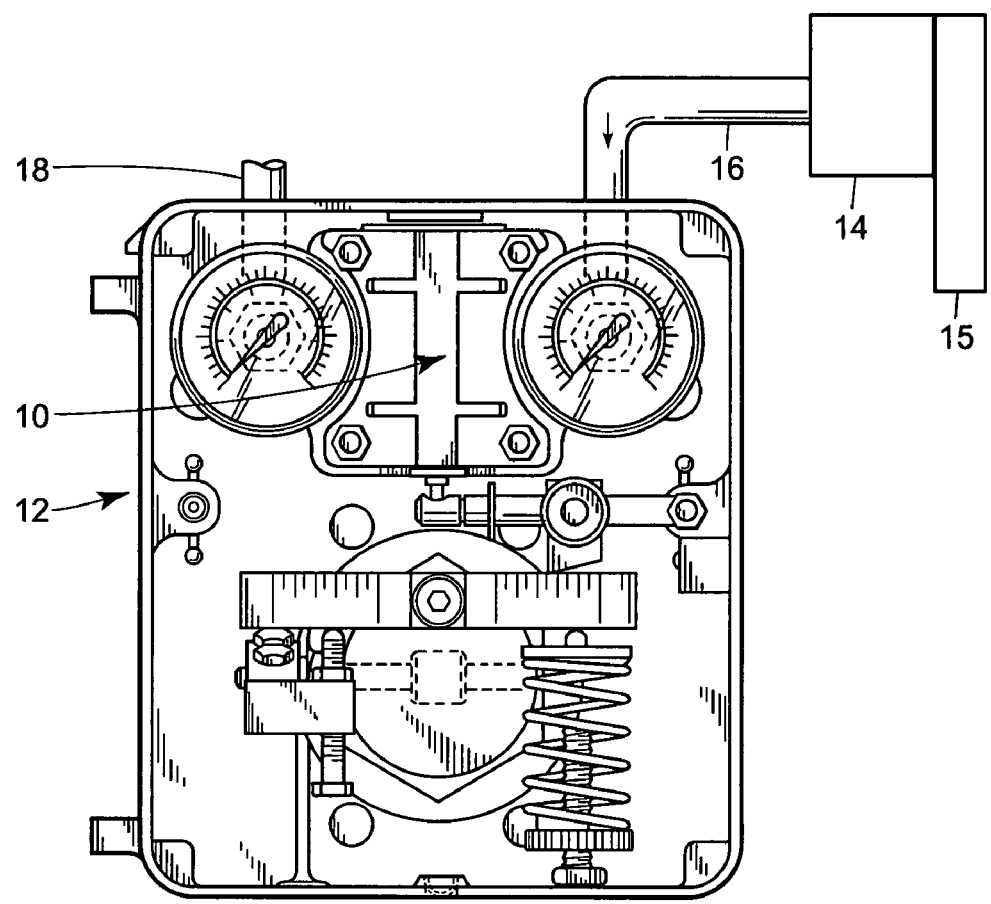
FIG. 1 is schematic view of a liquid level controller having a pneumatic pilot valve and coupled to a vessel for storing liquid.

Referring now to the drawings, FIG. 1 illustrates a pilot valve assembled in accordance with the teachings of the present invention and generally referred to by the reference 10 and shown installed on a liquid level controller 12 for controlling the level of liquid in a vessel 15. The liquid level controller 12 is operatively coupled to a pneumatic supply line 18, and is operatively coupled to a dump valve 14 through a pneumatic line 16. As would be known, the liquid level controller 12 is arranged to control the level of liquid in the vessel 15. As would also be known, the pneumatic line 18 may be connected to a pneumatic source such as, for example, shop air, or to any other pneumatic source such as a pressurized process medium flowing through a process environment. Except for the pilot valve 10 described herein, the liquid level controller 12 may in all other respects be conventional.

Figure 2:
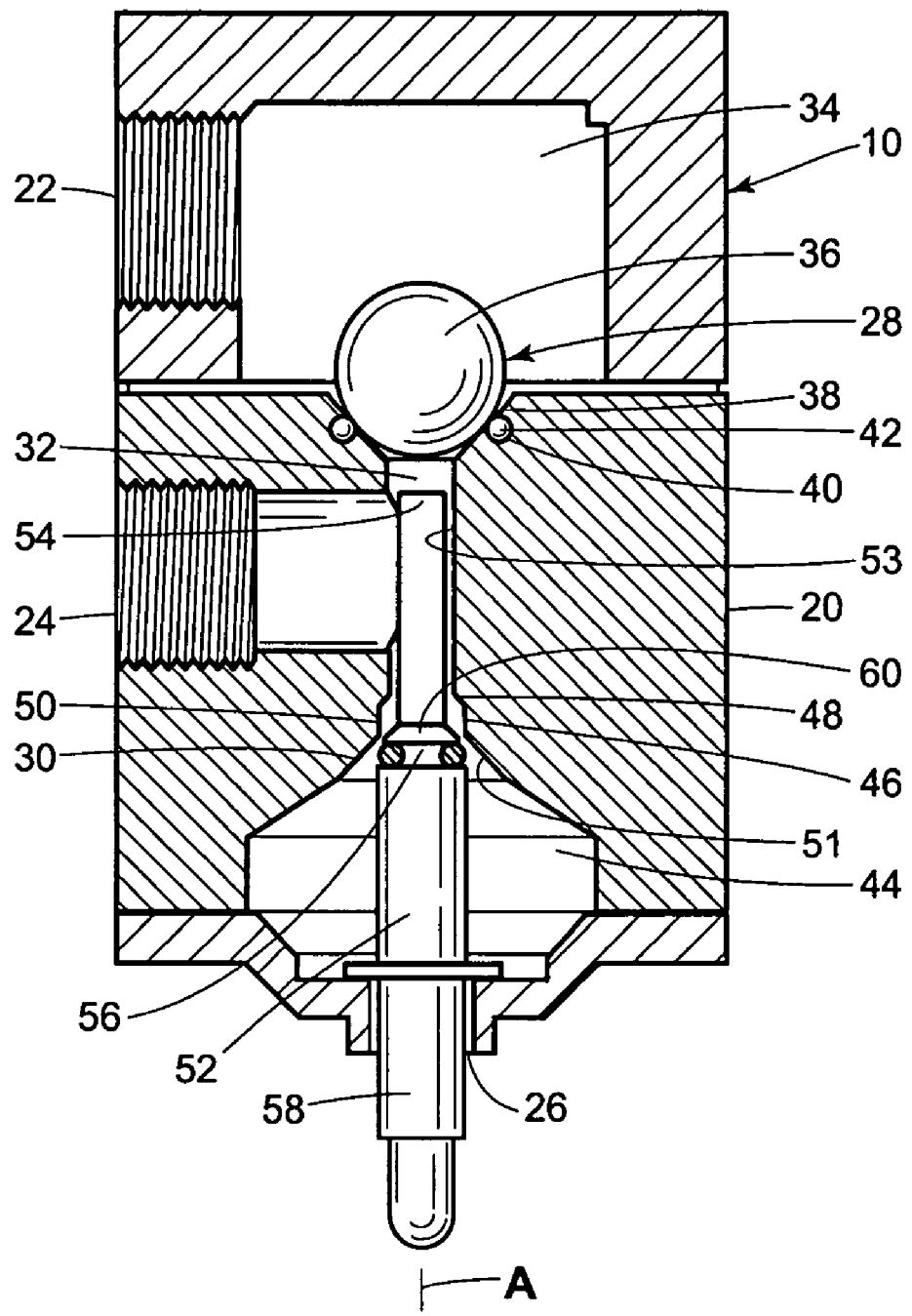
FIG. 2 is cross-sectional view of a pneumatic pilot valve for use with the liquid level controller and assembled in accordance with the teachings of a first disclosed example of the present invention, a thrust pin of the pilot valve is shown in a first position.
Figure 3:
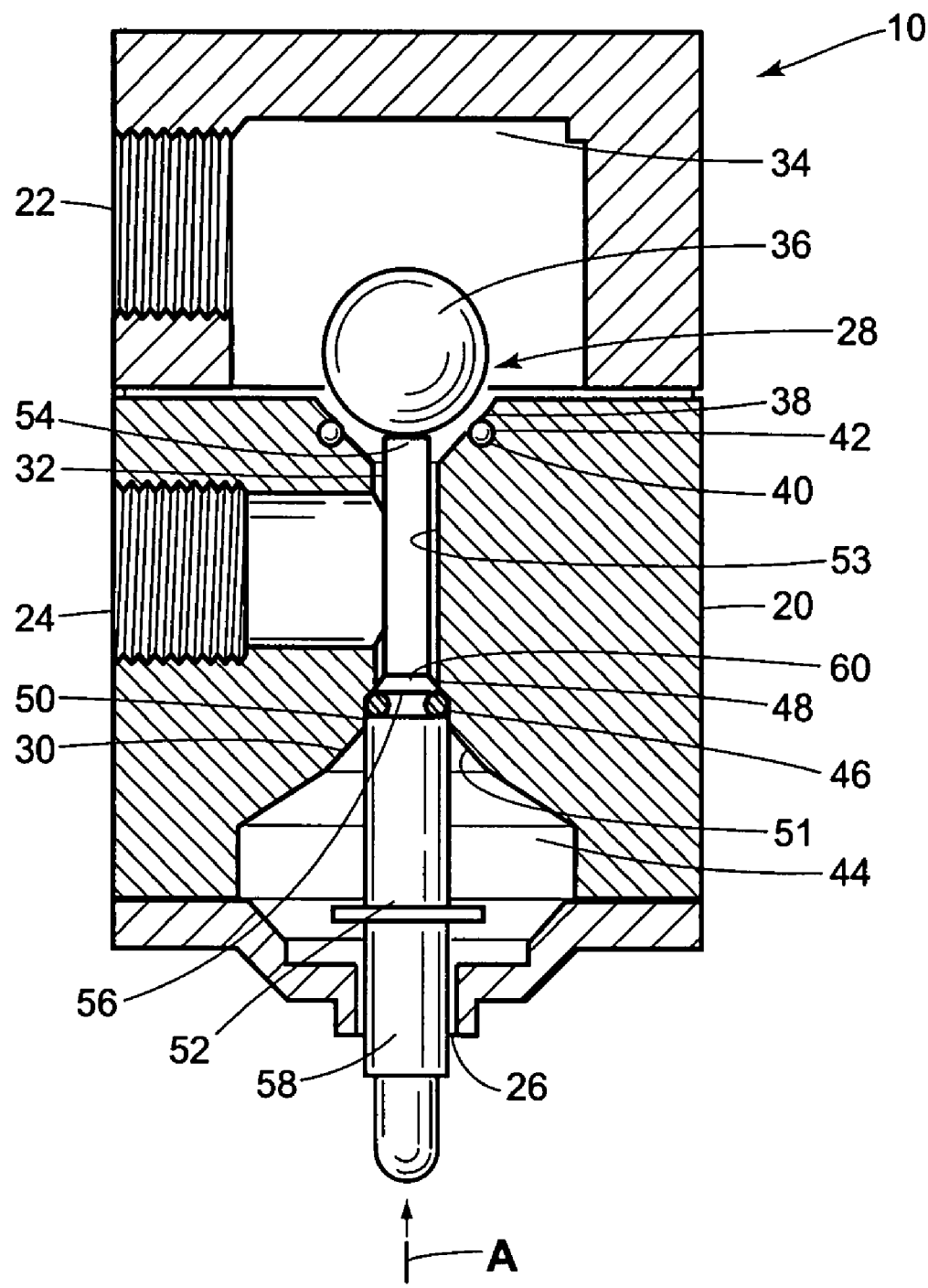
FIG. 3 is a cross-sectional view of the pneumatic pilot valve of FIG. 2 and showing the thrust pin in the second position.
Figure 4:
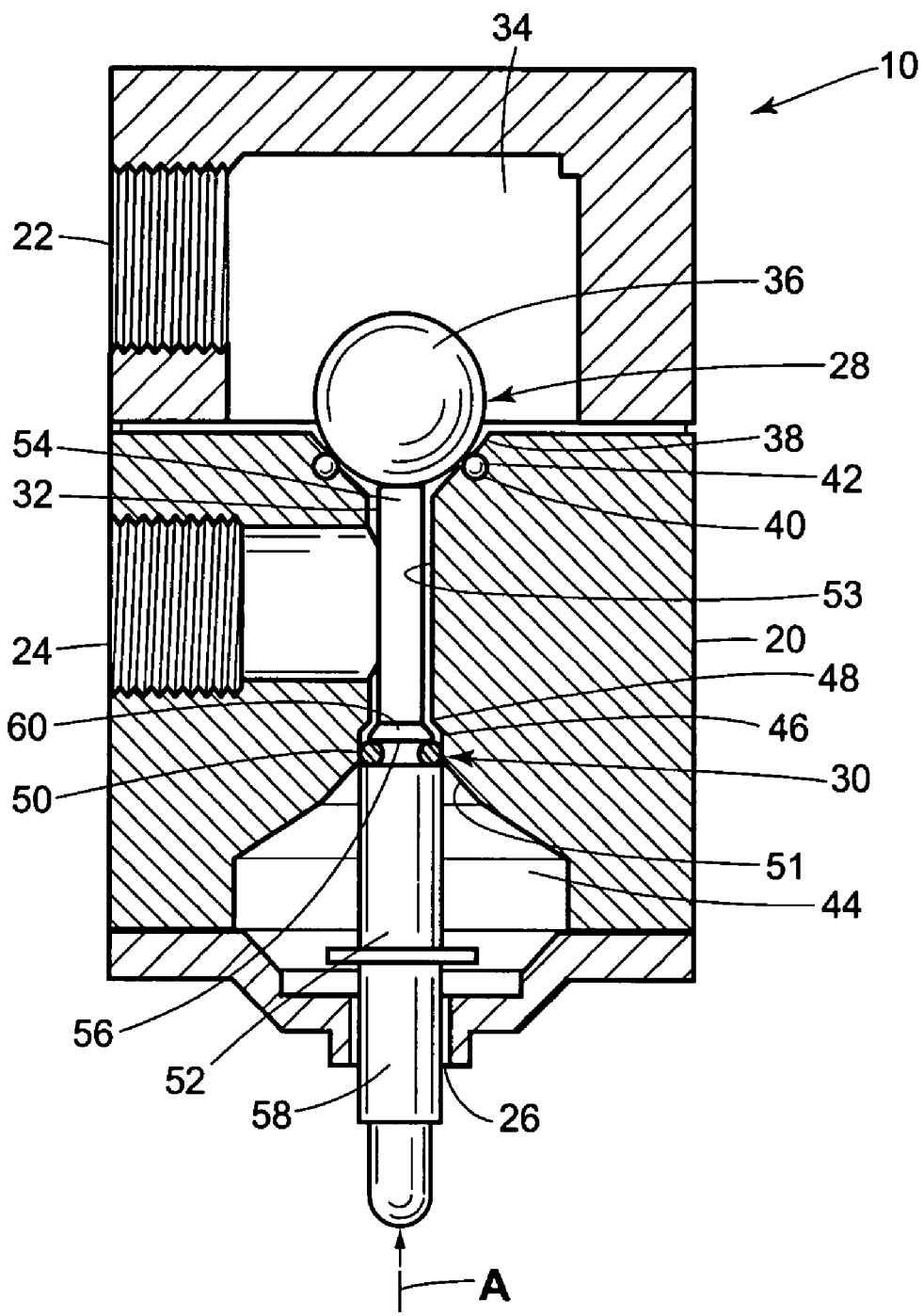
FIG. 4 is a cross-sectional view of the pneumatic pilot valve of FIGS. 2 and 3 and showing the thrust pin in the intermediate position.

Referring now to FIGS. 2-4, the pilot valve 10 is shown in cross-section. The pilot valve 10 includes a valve body 20 having an inlet 22 and an outlet 24. It will be understood that, as would be known to those of skill in the art, the inlet 22 and the outlet 24 are in flow communication with the pneumatic lines 16 and 18, respectively. The valve body 20 also includes an exhaust port 26. The pilot valve 10 includes an upper or first valve 28 and a lower or second valve 30, and a flow passage 32 is defined through the valve body 20. As would be known, the flow passage 32 extends generally between the inlet 22 and the outlet 24. However, as will be explained in greater detail below, in certain circumstances the exhaust port 26 will be in flow communication with the flow passage 32.

The first valve 28 is disposed in an upper chamber 34, and includes a ball 36 sized to be received in a tapered valve seat 38. The upper chamber 34 is in flow communication with and forms part of the flow passage. Preferably, the valve seat 38 includes a recess 40 sized to receive a seal 42. As would be known, a spring may be provided in order to bias the ball 36 against the valve seat 38. Preferably, the seal 42 is an O-ring, and further is preferably constructed of resilient elastomeric material of the type commonly employed in the art.

The second valve 30 is disposed in a lower chamber 44 and includes a valve seat 46. The lower chamber 44 is in flow communication with and forms part of the flow passage. In accordance with the disclosed example, the valve seat 46 includes a tapered bore 48 and a cylindrical bore 50. The tapered bore 48 and the cylindrical bore 50 are shown more fully in FIGS. 5-7 and will be explained in greater detail below. In the example shown, the cylindrical bore opens into another tapered bore 51.

A thrust pin 52 is shiftably disposed within the valve body 20, such that the thrust pin 52 is shiftable between a first position as shown in FIG. 2, a second position as shown in FIG. 3, and an intermediate position as shown in FIG. 4. The thrust pin 52 is sized to fit within a bore 53 that generally connects the upper chamber 34 and a lower chamber 44. The thrust pin 52 shifts between the various positions in a direction parallel to an axis of the thrust pin 52 indicated by the reference arrow A. The thrust pin 52 includes a first section 54, a second section 56, and a lower section 58. The lower section 58 preferably extends through the exhaust port 26 as would be known. The first section 54 of the thrust pin 52 is positioned to engage the ball 36 of the first valve 28 when the thrust pin 52 approaches the second position. Consequently, the thrust pin 52 will lift the ball 36 off the valve seat 38 when the thrust pin 52 moves upwardly far enough.

The second section 56 of the thrust pin 52 includes a tapered part 60 and an annular recess 62. A seal 64 is disposed in the annular recess 62. Preferably, the annular recess 62 is closely adjacent to or immediately adjacent to a lower edge 66 of the tapered part 60. As will be explained in greater detail below, the tapered part 60 is sized and shaped to form a seal against the valve seat 46 of the second valve 30, while the annular recess 62 and a seal 64 are sized and shaped to form a seal when the seal 64 enters or is otherwise disposed in the cylindrical bore 50 of the valve seat 46.

Figure 5:
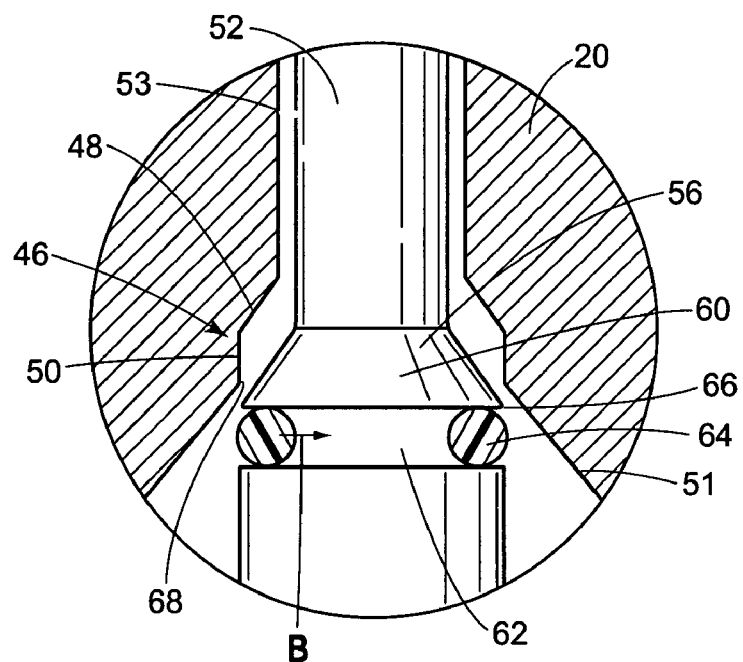
FIG. 5 is an enlarged fragmentary cross-sectional view taken about the circumscribed portion of FIG. 2.
Figure 6:
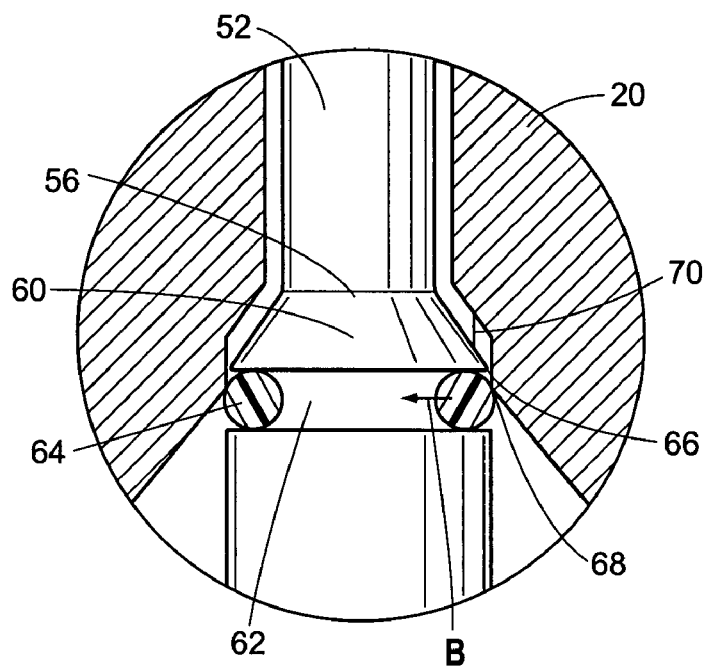
FIG. 6 is an enlarged fragmentary cross-sectional view taken about the circumscribed portion of FIG. 4.
Figure 7:
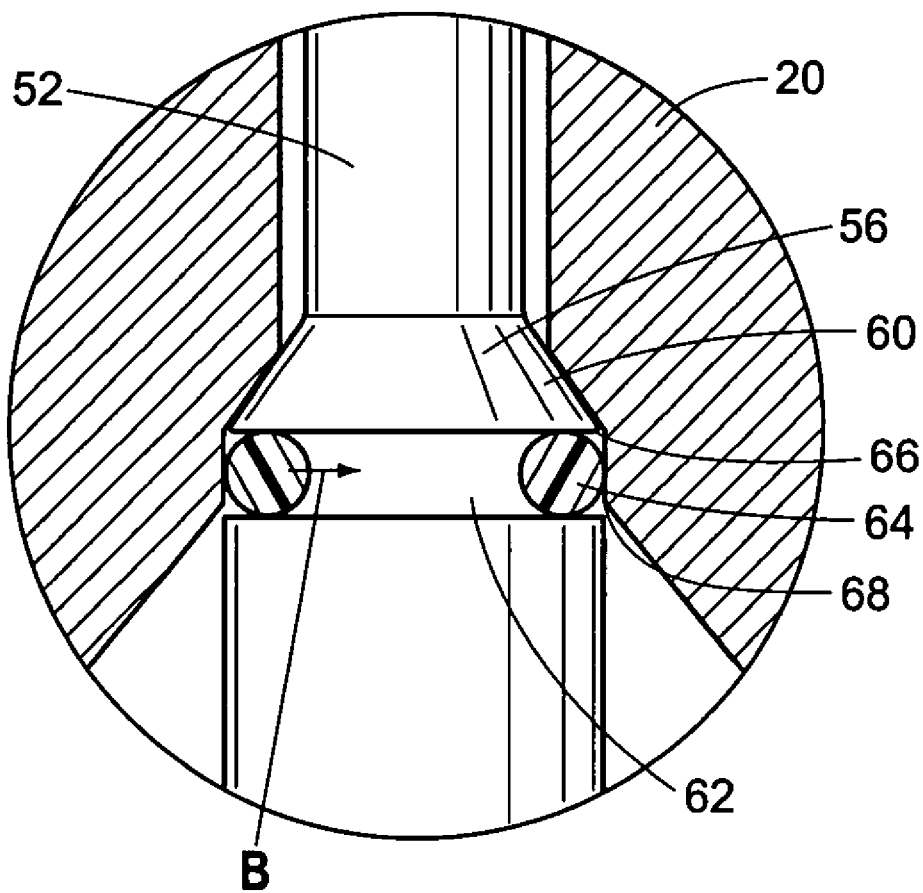
FIG. 7 is an enlarged fragmentary cross-sectional view taken about the circumscribed portion of FIG. 3.

Referring now to FIGS. 5-7, the second valve seat 46 and the second section 56 of the thrust pin 52 are shown in greater detail. It will be appreciated that in FIG. 5 the thrust pin 52 is shown in the first position, which corresponds to the position shown in FIG. 2. As stated above, the first valve 28 is closed and the second valve 30 is open when the thrust pin 52 is in the first position. FIG. 7 shows the thrust pin 52 in the second position, which corresponds to the position shown in FIG. 3. In the second position, the first valve 28 is open and the second valve 30 is closed. As can be seen in FIG. 7, the tapered part 60 of the thrust pin 52 is seated against the tapered bore 48 of the valve seat 46. Consequently, the second valve 30 is closed by virtue of the metal-to-metal contact between the tapered part 60 of the thrust pin 52 and the tapered bore 48 of the valve seat 46. Of course, the construction of the component parts are not limited to metal. Finally, FIG. 6 shows the thrust pin 52 in the intermediate position, which corresponds to the position shown in FIG. 4. In the position of FIG. 6, the seal 64 is disposed at an opening 68 of the cylindrical bore 50. Consequently, even though the tapered part 60 of the thrust pin 52 has not yet contacted the tapered bore 48 of the valve seat 46, the seal 64 forms a seal with the cylindrical bore 50 of the valve seat 46.

In accordance with the disclosed example, the second valve 30 includes a deadband 70. The deadband 70 is the distance traveled by the thrust pin 52 between the point at which the seal 64 is disposed at or otherwise enters the opening 68 of the cylindrical bore 50, and the point at which the tapered part 60 of the thrust pin 52 is seated against the tapered bore 48 of the valve seat 46, thus closing the second valve 30 with the above-referenced metal-to-metal contact. Stated another way, the deadband 70 may be viewed as the distance the thrust pin 52 may travel while the first valve 28 and the second valve 30 are both effectively closed. It will be understood that, depending on the outer diameter of the seal 64, the seal 64 might first make contact with the surface of the tapered bore 51 disposed immediately outside of the cylindrical bore 50. Consequently, the deadband 70 may extend to that point at which the seal 64 first forms a seal with the surrounding surface of the tapered bore 51. It will be appreciated that, in the example of FIGS. 5-7, the deadband 70 is a fixed distance. It will also be appreciated that, depending on the thermal properties of the various components, the seal 64 and/or the surrounding valve body 20 may expand or contract at different rates as the temperature changes.

Figure 8:
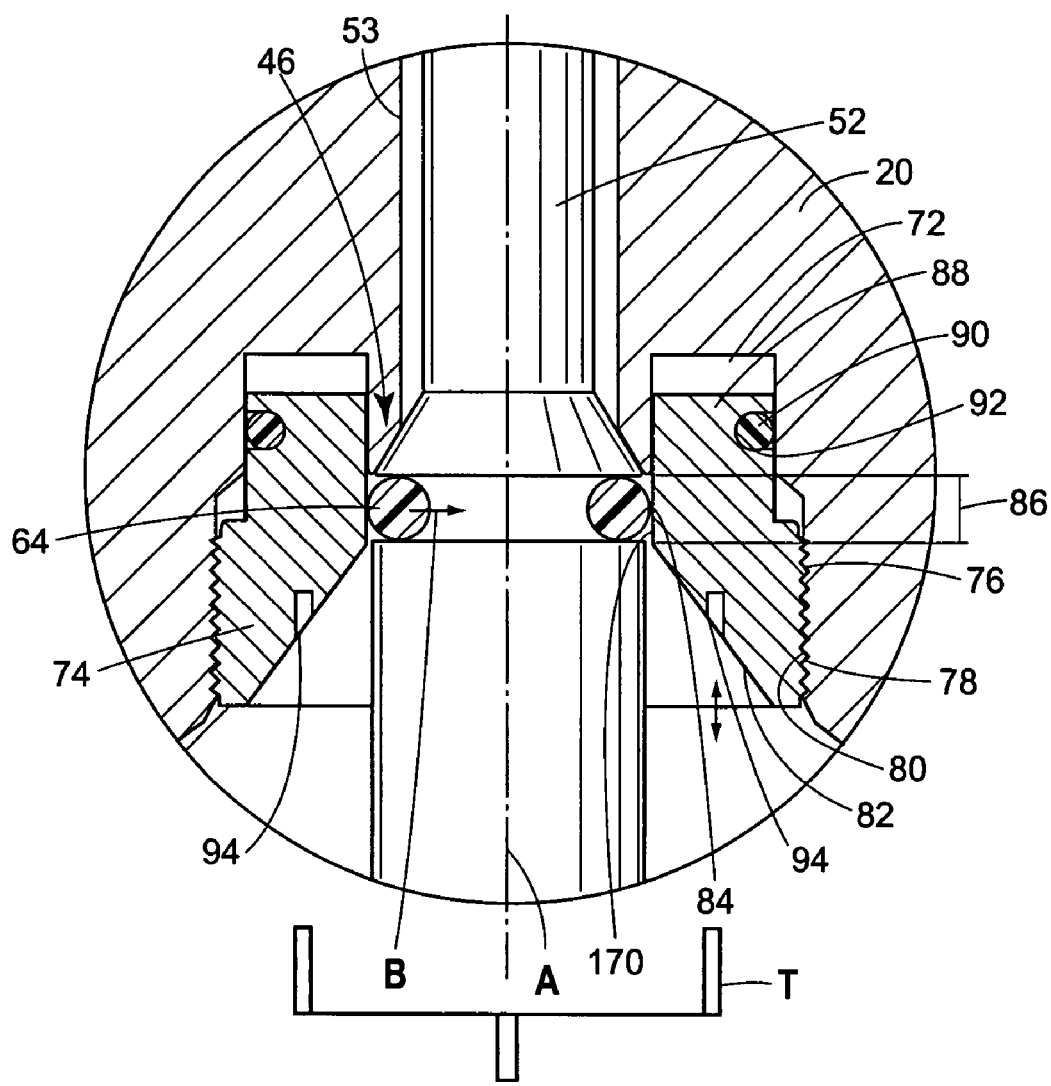
FIG. 8 is an enlarged fragmentary cross-sectional view of a pneumatic pilot valve assembled in accordance with the teachings of a second disclosed example of the present invention.

Referring now to FIG. 8, the second valve seat 30 is shown assembled in accordance with the teachings of the second disclosed example of the present invention. The valve body 20 includes an annular recess 72 surrounding and spaced radially outwardly from the bore 53 of the valve body 20. An adjustment collar 74 is sized to fit within the annular recess 72. Preferably, the valve body 20 includes threads 76 sized to be engaged by corresponding threads 78 on an outer surface 80 of the adjustment collar 74. The adjustment collar includes a tapered or generally conically-shaped bore 82 which terminates at a cylindrical bore 84 having a straight section 86. An inner section 88 of the adjustment collar 74 is sized to fit within the recess 72. Preferably, a seal 90 is provided between the inner section 88 and the recess 72 in the valve body 20. In the example shown, the seal 90 is in O-ring seal, such as an elastomeric seal, sized to fit in a recess 92 formed in an outer surface of the inner section 88.

Preferably, the adjustment collar 74 includes one or more recesses 94 sized to be engaged by a suitable adjustment tool T, such that the adjustment collar 74 can be rotated about the axis A, thereby enabling a user to position the adjustment collar 74 as desired. For example, and with reference to right-hand threads, by rotating the adjustment collar 74 clockwise about the axis A, the adjustment collar 74 can be adjusted further inwardly (i.e., upwardly when viewing the Figures) into the valve body 20. On the other hand, the adjustment collar 74 can be adjusted outwardly (i.e., downwardly when viewing the Figures) further out of the valve body 20 by rotating the adjustment collar 74 in a counterclockwise direction.

Accordingly, by adjusting the adjustment collar 74 as discussed, only an exposed portion of the cylindrical bore 84 of the adjustment collar 74 will protrude from the recess 72. By altering the length of the exposed portion, the second valve seat 46 as shown in FIG. 8 includes an adjustable deadband 170. Once again, the deadband may be defined by the distance traveled by the thrust pin 52 between the point at which the seal makes contact with the cylindrical bore 84 of the adjustment collar 74. Again, it will be understood that if the seal 64 might first make contact with the surface of the conically-shaped bore 82 of the adjustment collar 74.

In each of the foregoing examples, it will be appreciated that the seal 64 on the thrust pin 52 may be compressed in a direction B, which preferably is perpendicular to the axis A, or at least substantially or predominantly perpendicular relative to the axis A. Also, in the disclosed examples, the cylindrical bore 50 of the valve seat 46, as well as the cylindrical bore 84 of the adjustment collar 74 may have a slight taper.

In operation, as would be known, when the pilot valve 10 is positioned in the first position as shown in FIG. 2, the first valve 28 is closed because the ball 36 is seated on the valve seat 38. Typically, there is a gap between the first section 54 of the thrust pin 52 and the ball 36. In this configuration, there is no flow of the process medium or other pneumatic source past the first valve 28.

When the thrust pin 52 begins to move upwardly in a known manner, the thrust pin 52 will eventually reach the intermediate position of FIGS. 4 and 6. Before reaching the intermediate position, it is possible that both of the first valve 28 and the second valve 30 are open which, as would be known, may cause a quantity of the pneumatic source to be exhausted through the exhaust port 26. When the thrust pin 52 reaches the intermediate position, the seal 64-forms a seal with the surrounding surface, which may be the tapered section 51 immediately outside the cylindrical bore 50, or may be the inner surface of the cylindrical bore 50. Consequently, the second valve 30 is at least partially closed. Finally, as discussed above, when the thrust pin travels far enough, the tapered part 60 of the thrust pin makes contact with the tapered bore 48 of the valve seat 46, thereby fully closing the second valve 30.

In accordance with the disclosed example, the disclosed pilot valve 10 may be especially useful in process environments where shop air is not available, such as in environments where natural gas, other hydrocarbons, or other process mediums are used as a pneumatic source. Consequently, the exhausting of the pneumatic source may be minimized or eliminated, offering favorable environmental and/or cost advantages. The reduced or eliminated transition bleed offered by the exemplary pilot valve offers a convenient compromise between pilot valve sensitivity, bleed rate, and crispness of snap action, and further offers a degree of adjustability relative to these parameters. The deadband of the embodiments disclosed herein may help to ensure that the second valve is closed before the first valve is opened, thereby minimizing exhaust through the exhaust port.

In further accordance with the disclosed examples, the exemplary pilot valve 10 may exhibit improved performance relative to transition bleed across a wider temperature range. Further, the exemplary pilot valve disclosed herein may permit improved O-ring compression without requiring an increase in the force required to operate the thrust pin 52.

The above-identified pilot valve pin, the liquid level controller 12, and/or the vessel 15 may be provided with suitable O-rings, seals, and/or other components as may commonly be used in the art. Further, except as noted, the two foregoing examples need not be mutually exclusive with the other example(s) shown, and each embodiment may incorporate features and structures as shown in the other embodiment.

The preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed:

1. A pneumatic pilot valve comprising:
a valve body having an inlet, an outlet, and a flow passage extending between the inlet and the outlet;
a first valve arranged to control flow through a first part of the flow passage;
a second valve arranged to control flow through a second part of the flow passage, the second valve including a tapered valve seat, the tapered valve seat comprising a tapered seating surface opening into a cylindrical seating surface;
a thrust pin disposed in the flow passage and having a first part and a tapered second part, the thrust pin including an annular recess adjacent the tapered second part, the thrust pin movable between a first position, a second position, and an intermediate position;
a resilient seal sized to fit in the annular recess;
the first part of the thrust pin arranged to permit the closing of the first valve in the first position or the intermediate position and arranged to permit the opening of the first valve in the second position;
the tapered second part of the thrust pin arranged to permit the opening of the second valve in the first position and arranged to permit the closing of the second valve in the second position; and
the annular recess arranged to permit the resilient seal to sealingly engage the cylindrical seating surface to close the second valve when the thrust pin is in the intermediate position or the second position to provide non-simultaneous actuation of the first and second valves thereby defining a pilot valve deadband to eliminate a transition flow through the flow passage in the intermediate position.

2. The pneumatic pilot valve of claim 1, wherein the resilient seal is an elastomeric O-ring.

3. The pneumatic pilot valve of claim 1, wherein the annular recess is disposed immediately adjacent the tapered second part of the thrust pin.

4. The pneumatic pilot valve of claim 1, the thrust pin defining an axis, the annular recess and the cylindrical seating surface sized and positioned to compress the resilient seal in a direction predominantly perpendicular to the axis.

5. The pneumatic pilot valve of claim 1, wherein the cylindrical seating surface opens into a tapered area, and wherein the resilient seal engages the tapered area when the thrust pin approaches the intermediate position.

6. The pneumatic pilot valve of claim 1, wherein a distance traveled by the thrust pin between a point where the resilient seal is disposed in an opening of the cylindrical seating surface in the intermediate position and a point where the thrust pin is in the second position comprises a deadband.

7. The pneumatic pilot valve of claim 1, wherein the valve body includes an adjustment recess, and wherein the cylindrical seating surface is operatively coupled to an adjustment collar, the adjustment collar shiftably disposed in the adjustment recess in a direction parallel to an axis of the thrust pin.

8. The pneumatic pilot valve of claim 7, wherein the adjustment recess and the adjustment collar are threaded.

9. The pneumatic pilot valve of claim 8, wherein the adjustment recess is disposed about an axis coaxial with the axis of the thrust pin.

10. The pneumatic pilot valve of claim 7, wherein the adjustment recess is formed in the valve body and including a seal disposed in the adjustment recess between the adjustment collar and the valve body.

11. A pilot valve for use with a liquid level controller and comprising:
a valve body having an inlet, an outlet, a flow passage extending between the inlet and the outlet, and an exhaust port in communication with the flow passage;
a first valve comprising a ball and arranged to control flow through a first part of the flow passage;
a second valve arranged to control flow through a second part of the flow passage, the second valve including a valve seat, the valve seat comprising a tapered seating surface and a cylindrical seating surface;
a thrust pin disposed in the flow passage and having a first part and a second part, the thrust pin including a resilient seal adjacent the second part, the thrust pin movable between a first position, a second position, and an intermediate position;
the first part of the thrust pin arranged to close the first valve in the first position as the thrust pin moves out of contact with the ball and arranged to open the first valve in the second position;
the second part of the thrust pin arranged to open the second valve in the first position and close the second valve in the intermediate position and in the second position; and
the resilient seal sized to seal the cylindrical seating surface in the intermediate position to provide non-simultaneous actuation of the first and second valve thereby defining a pilot valve deadband to eliminate a transition flow through the flow passage.

12. The device of claim 11, wherein the resilient seal is an elastomeric O-ring.

13. The device of claim 11, wherein the seal is disposed in an annular recess located adjacent the second part of the thrust pin.

14. The device of claim 13, the thrust pin defining an axis, the annular recess and the cylindrical seating surface sized and positioned to compress the resilient seal in a direction perpendicular or substantially perpendicular to the axis.

15. The device of claim 11, the thrust pin having a longitudinal axis, and wherein a distance traveled by the thrust pin measured along the axis between a point where the resilient seal is disposed in an opening of the cylindrical seating surface and a point where the thrust pin is pin is the second position comprises a deadband.

16. The device of claim 11, wherein the valve body includes an adjustment recess having an axis and surrounding and generally coaxial with an axis of the second valve seat, the cylindrical seating surface carried by an adjustment collar adjustably disposed in the adjustment recess.

17. The device of claim 16, wherein the adjustment recess and the adjustment collar are threaded.

18. The device of claim 17, including a seal disposed in the adjustment recess between the adjustment collar and the valve body.

19. The device of claim 11, and further comprising a liquid level controller having a first line in flow communication with the inlet of the valve body, and a second line in flow communication with the outlet of the valve body.

20. The device of claim 19, wherein the liquid level controller is in flow communication with a vessel and arranged to control a level of liquid in the vessel.

21. A pneumatic pilot valve comprising:
a valve body having an inlet, an outlet, and a flow passage extending between the inlet and the outlet;
a first valve arranged to control flow through a first part of the flow passage, and a second valve arranged to control flow through a second part of the flow passage, each of the first and second valves including a tapered valve seat, the tapered valve seat of the second valve including a tapered seating surface and a cylindrical seating surface;
a thrust pin disposed in the flow passage and having a first part and a tapered second part, the valve body including a first resilient seal disposed adjacent the first valve and the thrust pin including a second resilient seal disposed adjacent the second part of the thrust pin, the thrust pin movable between a first position, a first intermediate position spaced away from the first position by a first deadband, a second position, and a second intermediate position spaced away from the second position by a second deadband;
the first part of the thrust pin closing the first valve as the thrust pin moves into the first position;
the tapered second part of the thrust pin closing the second valve as the thrust pin moves into the second position, the second resilient seal arranged to close the second cylindrical seating surface when the thrust pin is in the second intermediate position such that the first deadband and the second deadband define a pilot valve deadband that provides non-simultaneous actuation of the first and second valves to eliminate a transition flow of a pilot valve.

22. A pneumatic pilot valve comprising:
a valve body having an inlet, an outlet, and a flow passage extending between the inlet and the outlet;
a first valve arranged to control flow through a first part of the flow passage;
a second valve arranged to control flow through a second part of the flow passage, the second valve including a tapered valve seat, the tapered valve seat comprising a tapered seating surface and a cylindrical seating surface;
a thrust pin disposed in the flow passage and having a first part and a tapered second part having a seal disposed in an annular recess adjacent a lower edge of the tapered part, the thrust pin movable between a first position, a second position, and an intermediate position;
the first part of the thrust pin arranged to close the first valve in the first position and arranged to open of the first valve in the second position;
the tapered second part of the thrust pin arranged to engage the tapered valve seat to close the second valve when the thrust pin moves into the second position and open the second valve in the first position; and
the resilient seal sized to form a seal adjacent the second valve seat when the thrust pin is in the intermediate position;
the distance movable by the thrust pin in the intermediate position to non-simultaneously actuate the first and second valves thereby defining a pilot valve deadband to eliminate a transition flow of the pilot valve.

23. The device of claim 22, wherein the second valve seat is sized and shaped such that the deadband is adjustable.

* * * * *

UNITED STATES PATENT AND TRADEMARK OFFICE
CERTIFICATE OF CORRECTION

Page 1 of 1

PATENT NO. : 8,220,485 B2
APPLICATION NO. : 11/141790
DATED : July 17, 2012
INVENTOR(S) : Michel K. Lovell It is certified that error appears in the above-identified patent and that said Letters Patent is hereby corrected as shown below:

In the Specification:

At Column 4, line 66, "are" should be -- is --.

In the Claims:

At Column 8, line 49, "pin is pin is" should be -- pin is in --.

Signed and Sealed this
Twenty-ninth Day of April, 2014

Michelle K. Lee
*Deputy Director of the United States Patent and Trademark Office*